United States Patent Office 3,541,008
Patented Nov. 17, 1970

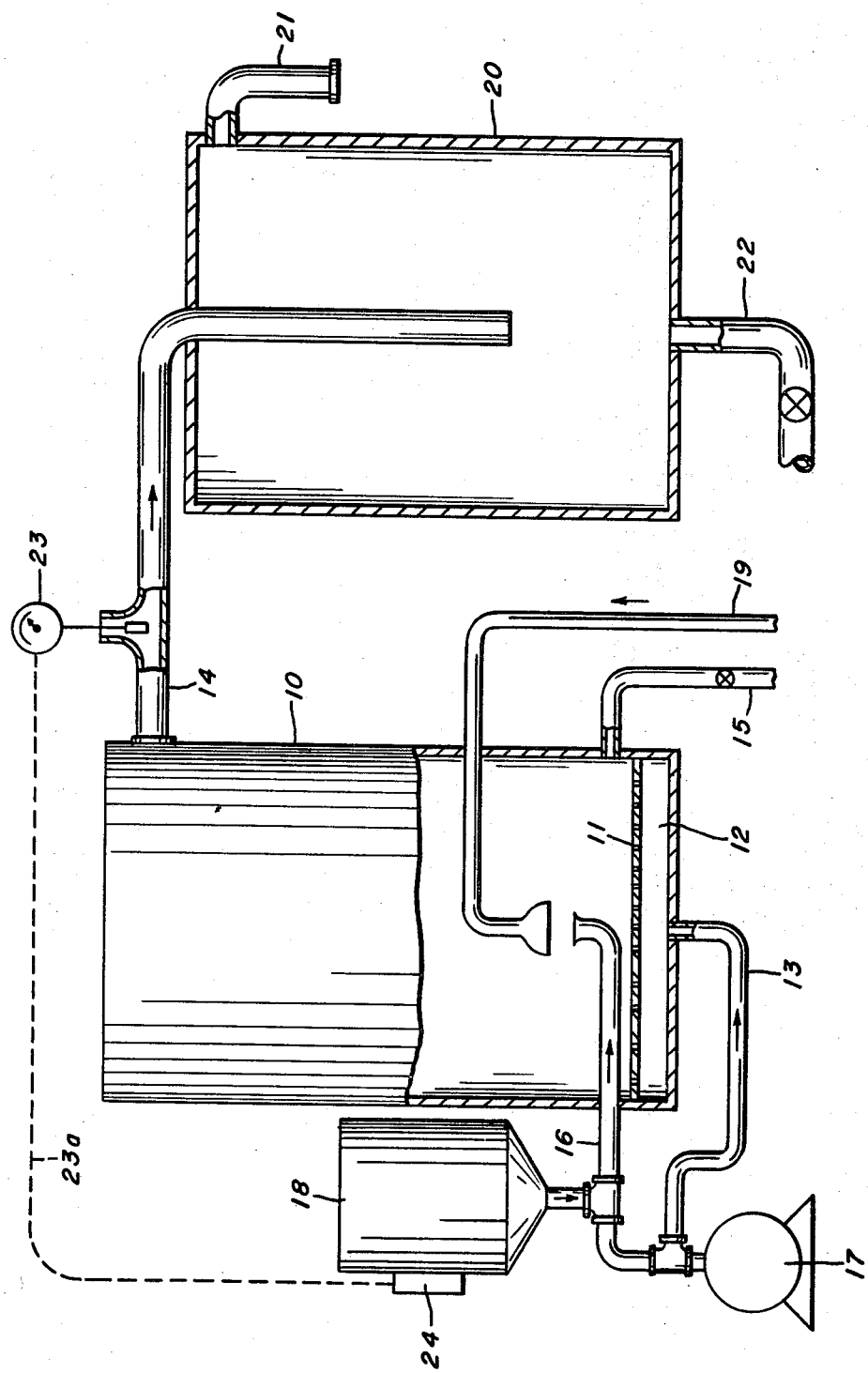

3,541,008
METHOD AND APPARATUS FOR NEUTRALIZING ACID WASTE WATER
Anthony A. Spinola, Penn Hills Township, Allegheny County, Pa., assignor to United States Steel Corporation, a corporation of Delaware
Filed Aug. 7, 1968, Ser. No. 767,875
Int. Cl. C02c 5/04
U.S. Cl. 210—49          3 Claims

ABSTRACT OF THE DISCLOSURE

A reaction chamber for holding water to be treated has a porous plate spaced above the bottom thereof, defining an air plenum. A water-inlet pipe discharges downwardly into the chamber at a level above the plate. A neutralizer-inlet pipe discharges upwardly into the chamber below said level but above said plate. Air under pressure is supplied to the plenum and neutralizer-inlet pipe. Solids removed from the effluent gases leaving a cement kiln are introduced into the air flowing through said neutralizer-inlet pipe for entrainment therewith.

CROSS-REFERENCE TO RELATED APPLICATION

My co-pending application Ser. No. 729,517, filed May 16, 1968 now abandoned, for Method For Neutralizing Acid Waste Water, discloses and claims the broad method herein disclosed. The method claimed herein is dependent on the apparatus hereof.

This invention relates to the neutralization of acid waste waters and, in particular, to a method utilizing as a neutralizing agent, the solids removed from the effluent gas leaving a cement kiln and apparatus for carrying out the method.

BACKGROUND OF THE INVENTION

The neutralization of acid waste waters has been a serious problem for industry of many years standing. The method principally used involves neutralization of the water by the addition of lime (CaO) but this method has serious disadvantages. I have invented an improved method, utilizing as a neutralizer, the solids removed from the effluent gases leaving a cement kiln, and apparatus for practicing the method.

BRIEF SUMMARY OF THE INVENTION

According to my invention, I bubble upwardly through water to be treated, air in which is entrained the solids removed from the effluent gases leaving a cement kiln. My apparatus for practicing this method is a chamber or tank for holding the water, having a porous plate spaced above the bottom thereof. A water-inlet pipe discharges downwardly into the chamber above the level of the plate. An air-and-solids-inlet pipe discharges upwardly into the chamber, above the plate but below the water-inlet level. Air is supplied under pressure to the plenum or space below the plate and to the air-inlet pipe. The solids serving as neutralizer are entrained with the air blowing through the air-inlet pipe. The input of neutralizer is controlled according to the pH of the treated water which overflows from the chamber into a settling tank.

BRIEF DESCRIPTION OF THE DRAWING

A complete understanding of the invention may be obtained from the following detailed description and explanation which refer to the accompanying drawing illustrating the present preferred embodiment, the single figure of which is a diagrammatic illustration of the apparatus of my invention.

DETAILED DESCRIPTION OF THE PREFERRED EMBODIMENT

Referring now in detail to the drawing, a reaction chamber 10, which may be a tank of suitable size, has a side wall and bottom with a porous plate 11 spaced above the bottom, forming an air plenum 12 therebelow. Plate 11 may be stainless steel, perforated, or a ceramic material of suitable porosity to permit flow of air therethrough at a low rate. An air-inlet pipe 13 communicates wtih plenum 12. Tank or chamber 10 has an overflow pipe 14 near the top for the exit of sludge and treated water and a drain pipe 15 connected near the bottom above plate 11 for tank drainage.

An air-inlet pipe 16 extends into the tank near the bottom and discharges upwardly. A compressor 17 supplies air to both pipes 13 and 16. A pneumatic injector 18 (Petrocarb Corporation No. 42-2) introduces into the air traversing pipe 16, a neutralizer in the form of a fine powder, viz., the solids removed from the effluent gases leaving a cement kiln. The air discharged by pipe 16 and penetrating through plate 11 forms bubbles in acid waste water collected in tank 10 and the ascending bubbles agitate the mixture of water and the powder discharged thereinto. This effects a quick neutralization of the acid dissolved in the water. Usually about 5 to 20 pounds of solids will reduce the acidity of 1000 gallons of water to a satisfactorily low level.

An inlet pipe 19 for water to be treated extends into chamber 10 and discharges downwardly from a point generally above the discharge end of pipe 16. As the level of water in the chamber rises, overflow of treated water through pipe 14 occurs. The overflow pipe discharges treated water into a settling chamber 20 having an outlet 21 for clear water and a sludge drain 22.

A pH meter 23 (Leeds & Northrup 200-992-041-925-6-024) in the overflow pipe 14, through a connection 23a, controls an automatic regulator 24 on the injector 18, to vary the input of neutralizer into pipe 16, according to the extent of neutralization effected on the water which has been treated in chamber 10. The control is such as to increase the amount of neutralizer if the acid content of the water flowing through the pipe 14 is excessive and vice versa.

It will be evident that the invention has important advantages over the present practice of neutralization of acid waste waters with lime. Among these are the fact that my process provides aeration and oxidation in addition to neutralization. In addition, the requirement for ground area is much less than that for lime neutralization. The apparatus is composed principally of static units and the only power requirement is that for pumping acid waters to the treatment chamber and compressing the air supplied thereto. This results in low power cost and maintenance.

Although I have disclosed herein the preferred embodiment of my invention, I intend to cover as well any change or modification therein which may be made without departing from the spirit and scope of the invention as set forth in the claims.

What is claimed is:

1. Apparatus for neutralizing acid waste water comprising a reaction chamber having a side wall, a bottom, and an overflow, a permeable plate spaced above the bottom of the chamber defining an air plenum therebelow, an inlet pipe for waste water extending into the chamber and discharging downwardly at a level above said plate, an inlet pipe for a neutralizing agent extending into the chamber and discharging upwardly at a level below said first mentioned level but above said plate, means for feeding a neutralizing agent in the form of fine powder into said second mentioned inlet pipe and means supplying air under pressure to said plenum and said second mentioned inlet pipe.

2. Apparatus as defined in claim 1, characterized by means controlling the feed of neutralizing agent according to the pH of effluent liquid traversing said overflow.

3. A method for simultaneously oxidizing and neutralizing acid waste waters which comprises bubbling air which is substantially free of solids upwardly through a reaction chamber filled to overflow with said acid waste waters, bubbling air containing entrained solids removed from the off-gases leaving a cement kiln upwardly into said reaction chamber at a level above the inlet for said solids-free air, discharging fresh acid waste water downwardly in countercurrent flow to said solids-free air and said air containing entrained solids at a level substantially below the surface of the acid waste water but above the inlet for said air containing entrained solids, collecting the overflow of sludge and treated water and separating the sludge therefrom.

References Cited

UNITED STATES PATENTS

| 1,364,387 | 1/1921 | Landreth | 210—42 |
| 1,672,584 | 6/1928 | Travers | 210—59 X |
| 2,692,229 | 10/1954 | Heise et al. | 210—60 X |
| 2,017,540 | 10/1935 | Kemp | 23—200 |

OTHER REFERENCES

Gurnham, C. F., Principles of Industrial Waste Treatment, 1955, John Wiley & Sons, Inc., New York, pp. 176–186 and 192–196.

MICHAEL E. ROGERS, Primary Examiner

U.S. Cl. X.R.

210—96, 199, 206